United States Patent
Craw et al.

(10) Patent No.: US 7,634,426 B2
(45) Date of Patent: Dec. 15, 2009

(54) GOLF RESERVATION SYSTEM

(75) Inventors: Duane Craw, Portland, OR (US); Frank Halpin, Portland, OR (US); Brett Darrow, Phoenix, AZ (US)

(73) Assignee: GolfNow, Inc., Portland, OR (US)

( * ) Notice: Subject to any disclaimer, the term of this patent is extended or adjusted under 35 U.S.C. 154(b) by 103 days.

(21) Appl. No.: 11/740,100

(22) Filed: Apr. 25, 2007

(65) Prior Publication Data

US 2008/0021789 A1 Jan. 24, 2008

Related U.S. Application Data

(60) Provisional application No. 60/746,760, filed on May 8, 2006.

(51) Int. Cl.
*G06Q 20/10* (2006.01)
(52) U.S. Cl. .............................. 705/22; 705/5; 705/28
(58) Field of Classification Search ............... 705/22
See application file for complete search history.

(56) References Cited

U.S. PATENT DOCUMENTS

| 5,319,548 | A | 6/1994 | Germain |
| 6,477,503 | B1 * | 11/2002 | Mankes ................ 705/5 |
| 7,016,857 | B1 | 3/2006 | Lloyd |
| 7,069,228 | B1 * | 6/2006 | Rose et al. ............ 705/5 |
| 7,249,041 | B2 | 7/2007 | Last |
| 2001/0027481 | A1 * | 10/2001 | Whyel ................ 709/218 |
| 2001/0037225 | A1 * | 11/2001 | Last .................... 705/5 |
| 2004/0249681 | A1 * | 12/2004 | Staten et al. ............ 705/5 |
| 2006/0089845 | A1 * | 4/2006 | Marcell et al. ......... 705/1 |

FOREIGN PATENT DOCUMENTS

WO      0063808      10/2000

* cited by examiner

*Primary Examiner*—F. Zeender
*Assistant Examiner*—Fateh M. Obaid
(74) *Attorney, Agent, or Firm*—Schwabe Williamson & Wyatt

(57) ABSTRACT

Embodiments of the present invention provide a golf reservation system. The golf reservation system may periodically poll tee-sheet systems to determine available inventory. The golf reservation system may use the results of these pollings for responding to a user request. Other embodiments may be described and claimed.

19 Claims, 3 Drawing Sheets

GOLF RESERVATION SYSTEM

RELATED APPLICATION

The present application is a non-provisional application of provisional application No. 60/746,760, filed on 8 May 2006, entitled "GOLF RESERVATION SYSTEM," and claims priority to said provisional application. The specification of said provisional application is also hereby fully incorporated by reference in its entirety, except for those sections, if any, that are inconsistent with this specification

FIELD

Embodiments of the present invention relate to the field of online reservation systems, more specifically, to an online golf reservation system.

BACKGROUND

Golf reservation systems may facilitate reserving tee-times for customers desiring to golf at a particular course at a particular time. Often, reservation of a tee-time may be made online over a wide area network (WAN) such as the Internet. While tee-time requests and booking online may be relatively straightforward if the user knows which course is desired, it may be complicated by a request to more than one course. A service processing such a request to more than one golf course may face challenges in providing the requested information to the user in a timely and efficient manner.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means (A), (B), or (A and B)." For the purposes of the present invention, the phrase "(A)B" means "(B) or (AB);" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide an online golf reservation system (OGRS) that may allow a user to search (and subsequently book, if desired) available tee-times for a plurality of golf courses in an efficient, timely manner.

Figure 1:
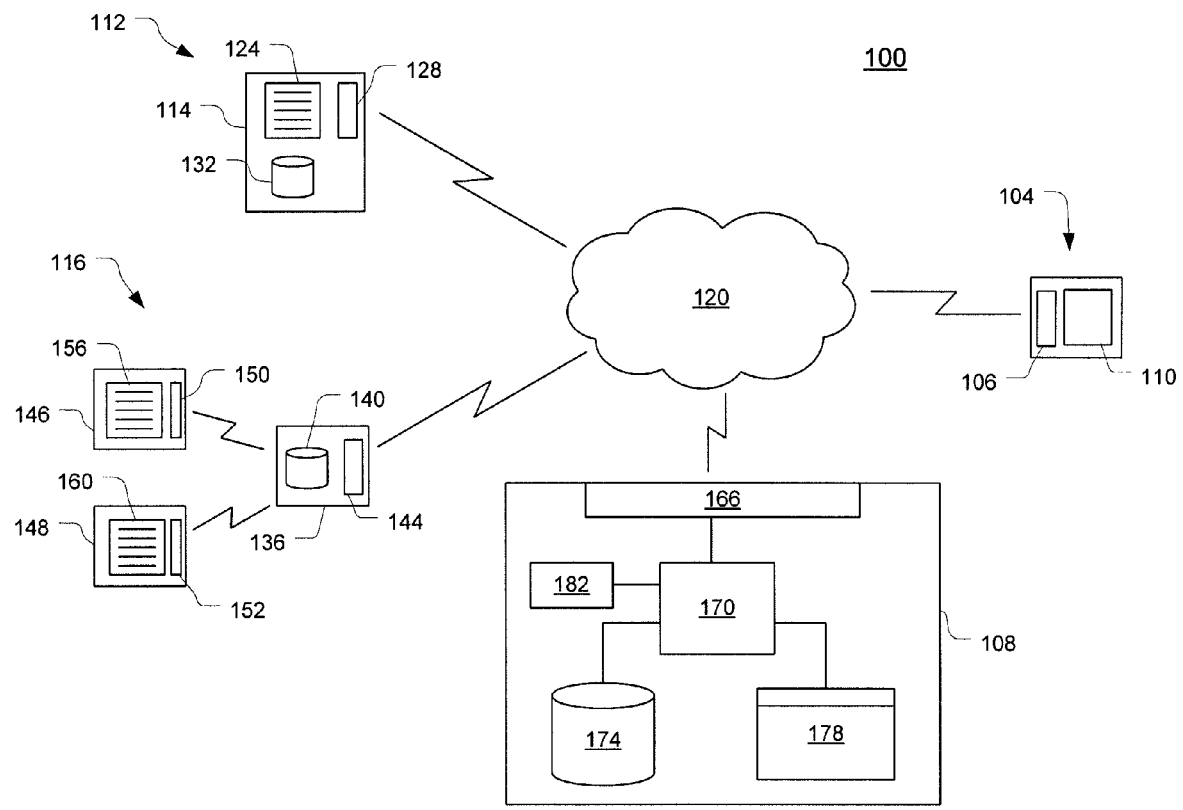
FIG. 1 illustrates a distributed golf reservation system in accordance with an embodiment of this invention.

FIG. 1 illustrates an OGRS 100 in accordance with an embodiment of this invention. In this embodiment, the OGRS 100 may include a user portal 104, a network-based golf server (NBGS) 108, and tee-sheet systems 112 and 116 coupled to one another over a computer network 120, e.g., a wide-area network (WAN), such as the Internet, as generally shown. Tee-sheet systems 112 and 116 may also be referred to simply as tee sheets 112 and 116.

The user portal 104 may be coupled to the computer network 120 via a communication interface 106 and may include a web browser configured to render web pages of a website hosted by the NBGS 108 on user interface 110. The website may allow the user to interact with the NBGS 108 and, ultimately, tee sheets 112 and 116 of various golf courses as will be described in further detail below.

The tee sheets 112 and 116 may include inventory management applications relied upon by golf courses to manage their tee-time inventory. In various embodiments, the tee sheets may include database management systems (DBSs) such as, but not limited to, Oracle database, Microsoft SQLServer, a Java DBS, etc. and may be implemented in any of a number of different ways.

The tee sheets 112 may be implemented at a client golf course's device 114 to control that golf course's inventory. The tee sheet 112 may include a user interface 124, a communication interface 128, and a database 132. As shown, all of the components of the tee sheet 112 are embodied in the device 114; however, in other embodiments, components of the tee sheet 112 may be distributed through a computing cluster.

A user, e.g., a golf course employee, may interact with the managed inventory of the database 132 through the user interface 124. The communication interface 128, which may include various hardware and/or software components, may provide a mechanism for communications between the tee sheet 112 and the NBGS 108 via the computer network 120.

The tee sheet 116 may be implemented through use of an application service provider (ASP) 136. The ASP 136 may include a database 140 to store and manage the inventory of a number of golf courses, and a communication interface 144 to provide a mechanism for communications between the tee sheet 116 and the NBGS 108 via the computer network 120.

In various embodiments, the communication interfaces 128 and 144 may include application programming interfaces (APIs) configured to allow for an exchange of information between the respective tee sheets 112 and 116 and the NBGS 108.

The ASP 136 may host an inventory management application for client golf courses, which may be coupled to the ASP 136 through devices 146 and 148. The devices 146 and 148 may have respective communication interfaces 150 and 152 to facilitate coupling to the ASP 136 via respective communication links. The ASP 136 may provide the inventory management application to user interfaces 156 and 160 through, e.g., web pages. In this embodiment the inventory may be stored and processed at the ASP 136.

Communication links are shown coupling the various components to the computer network 120 (and the components of the tee sheet 116) in FIG. 1. These communication links may be any combination of wired and/or wireless links. Furthermore, these communication links may also include one or more computer networks. For example, the communication links shown coupling devices 146 and 148 to the ASP 136 may include a WAN such as the Internet.

The NBGS 108 may include a communication interface 166, a controller 170, an inventory database 174, a cache 178, and memory 182 generally coupled to one another as shown. The memory 182 may include instructions, loaded from a storage medium, which when accessed by the controller 170 cause the NBGS 108 to operate in manner described in embodiments of this invention.

In various embodiments the cache 178 may be any repository of information and, in some embodiments, may be organized as a database used to store golf course inventory in a manner to facilitate the execution of search queries from the user portal 104. The inventory database 174, on the other hand, may be used to store golf course inventory in a manner to facilitate management and/or manipulation of the data from the NBGS 108 and/or tee sheets 112 and 116. In some embodiments the cache 178 and inventory database 174 may be combined into the same database.

Operations of the various components described above may now be described in the context of certain embodiments. Other embodiments not specifically described may nonetheless be implemented within the scope of the teachings disclosed herein.

Figure 2:
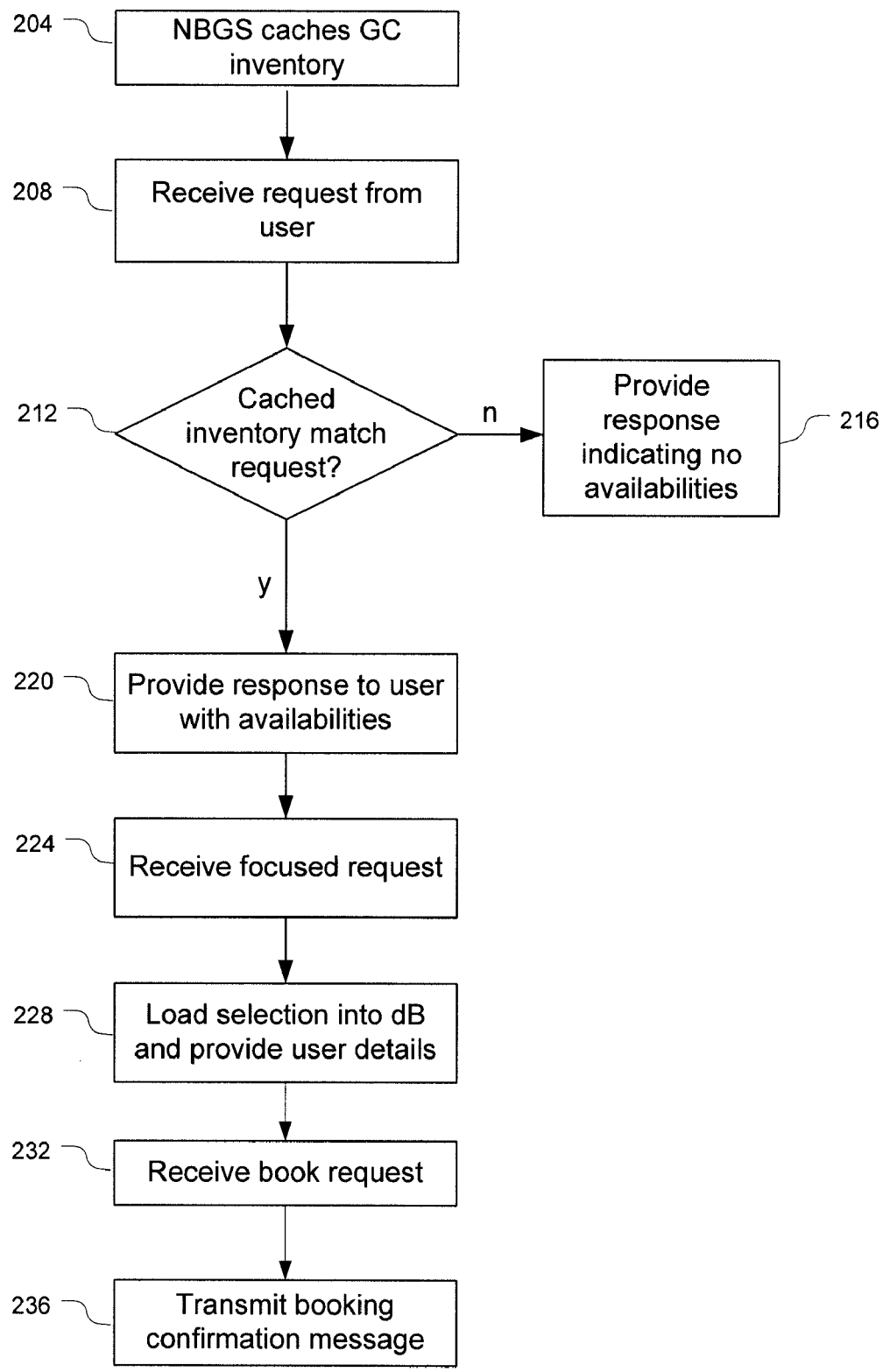
FIG. 2 illustrates a reservation operation in accordance with an embodiment of this invention.

FIG. 2 illustrates a reservation operation in accordance with an embodiment of this invention. In block 204 the NBGS 108 may cache available inventory of client golf courses. In block 208 the NBGS 108 may receive a request from a user of the user portal 104. This request, which may be transmitted through a web page hosted by the NBGS 108, may include initial search parameters such as, but not limited to, selection of golf courses and selection of times. In various embodiments, golf courses may be individually selected or selected based on certain criteria. For example, in various embodiments a user may select particular golf courses; golf courses within a geographic area; golf courses within a certain price range; and/or golf courses having a specified rating. Similarly, a user may select times of interest by providing a particular date and time, or providing a window of interest. Various embodiments may provide various selection mechanisms.

In the present embodiment, assume the initial search parameters include a selection of golf courses having the devices 114, 146, and 148 for a 9:00 am tee-time on an upcoming Saturday. In block 212 the NBGS 108 may run the parameters of the received request against the inventory stored in the cache 178.

If the cached inventory does not include an entry that satisfies request (e.g., a cache miss), the NBGS 108 may generate and transmit a response to the user indicating the absence of the requested tee-time in block 216.

If the cached inventory does include one or more entries that satisfy the request (e.g., cache hit(s)), the NBGS 108 may generate and transmit a response to the user including cursory information about the cache hit(s) in block 220. In various embodiments, various matching levels may be set. For example, in an embodiment it may be determined that tee-times within fifteen minutes of the requested time may be considered cache hits.

In an example embodiment, the cached inventory includes a tee-time of 9:05 am for the golf course having device 114 and a tee-time of 8:57 am for the golf course having device 146. Therefore, cursory information about these two tee-times may be returned to the user. The cursory information may be a subset of the total information about the inventory asset, e.g., the tee time, the golf course, and the number of spots available.

The user may provide a focused request by selecting one of the cache hit(s) for further information, e.g., 8:57 am at the golf course having the device 146. The NBGS 108 may then receive the focused request in block 224. The NBGS 108 may load the selected cache hit into the inventory database 174 as a tee-time entry and generate and transmit further details about the tee-time entry to the user in block 228. Further details may include, e.g., the price, whether a golf cart is included, etc.

If a user wishes to proceed with the transaction an appropriate selection may be made and the NBGS 108 may receive a book request in block 232. At that time, the NBGS 108 may transmit a booking confirmation message to the device associated with the tee-time entry, e.g., device 146, in order to confirm that the tee time is still available and, if so, reserve it for the user in block 236.

Embodiments shown and described provide a way for a user to search inventory of multiple golf courses through execution of queries against the cache 178 of the NBGS 108. With relevant information stored in the cache 178, requests may be handled primarily at the NBGS 108, with the communications to the device 146 at the golf course being limited to the confirmation-booking phase. This may, in turn, facilitate a reduction in processing delays that may be associated with transmissions between the NBGS 108 and the golf course device 146 at the time of the user request.

The reduction in processing delays experienced in embodiments of this invention may be especially noticeable when an initial request is directed to more than one golf course while the focused request is directed to one golf course (as is the case of the above-discussed example). The initial request may be run against the cache, without having to send multiple transmissions to multiple golf course devices. Once the user's selection has been pared down to one course, a direct communication with the selected course may be performed.

In order to provide relevant information in the cache 178 embodiments of this invention may employ dynamic caching. Dynamic caching, as used in embodiments of this invention, may provide that the rate at which the NBGS 108 polls the client golf courses for available inventory is adjusted based on the lead time (T) of the inventory. As used herein, lead time T may refer to the time between the present time and a particular tee-time and AI(T) may refer to available inventory for a given lead time T.

TABLE 1 illustrates a dynamic caching schedule in accordance with an embodiment of this invention.

TABLE 1

| Lead Time (T) | Polling Frequency |
| --- | --- |
| $t \leq 12$ hours | Once an hour |
| 12 hours $< t \leq 1$ day | Once every two hours |
| 1 day $< t \leq 3$ days | Once every three hours |
| 3 days $< t \leq 7$ days | Once every 12 hours |
| 7 days $< t \leq 30$ days | Once a day |

So, for example, every hour the client golf courses may be polled for AI($t \leq 12$ hours) (e.g., What tee-times are available in the next 12 hours); every other hour client golf courses may be polled for AI(12 hours<t≦24 hours) (e.g., What tee-times are available from 12 hours from now until 24 hours from now?); etc.

The dynamic caching taught in this embodiment may allow for more up-to-date inventory information being cached for periods most likely to be requested by the user and/or have a change of state of the inventory (e.g., as lead time T decreases).

As will be understood, various embodiments may employ dynamic caching schedules having polling frequencies and time periods other than those shown in TABLE 1.

In various embodiments, the polling may be initiated by the NBGS 108 or by the tee sheets 112 and 116.

In an embodiment, communication between tee sheets 112 and 116 and the NBGS 108 may be initiated by the tee sheets 112 and 116. This may be done to avoid complications due to security configurations (e.g., firewall settings) of tee sheets 112 and 116. This may also facilitate routing as the communication interfaces 128 and 144 may have their network addresses (e.g., IP addresses) dynamically configured at each connection. Therefore, in various embodiments the communication interfaces 128 and/or 144 may be configured to periodically query the NBGS 108 and leave open a communication channel for a predetermined time for a response from the NBGS 108. The response from the NBGS 108 may include a polling of inventory, a booking confirmation message, etc. If the NBGS 108 does not respond within the predetermined time, the communication interface 128 and/or 144 may close the communication channel until the next scheduled query.

Figure 3:
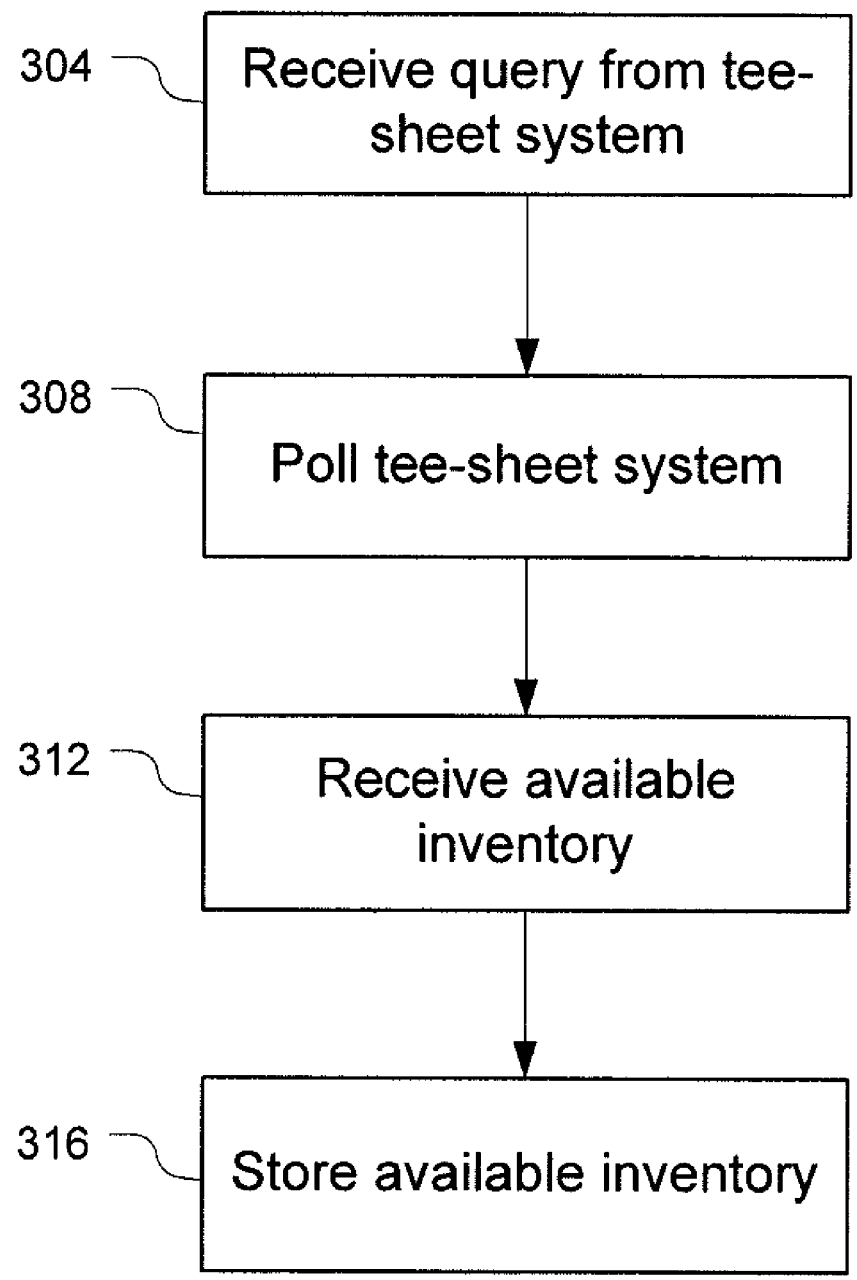
FIG. 3 illustrates a polling operation in accordance with an embodiment of this invention.

FIG. 3 illustrates a polling operation of the NBGS 108 in accordance with an embodiment of the present invention. In block 304 the NBGS 108 may receive a query from a tee sheet, e.g., tee sheet 112. As described above, the communication interface 128 may leave open a communication channel following said query. In block 308 the NBGS 108 may utilize this communication channel to poll the inventory based at least in part on a dynamic caching schedule. In block 312 the NBGS 108 may receive available inventory from the tee sheet 112 in response to the polling of block 308. In block 316 the NBGS 108 may store the available inventory in an accessible manner for responding to a subsequent user query.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A system comprising:
   a communication interface to communicatively couple the system to a network;
   a cache; and
   a controller coupled to the communication interface and the cache and configured to periodically poll a plurality of tee sheets, over the network, for available inventory assets, to receive available inventory assets from the plurality of tee sheets, and to store the available inventory assets in the cache, each of the available inventory assets associated with an inventory lead time and said periodic poll of the plurality of tee sheets is based at least in part on a dynamic caching schedule in which a polling frequency is based at least in part on an inventory lead time, wherein polling frequencies of a plurality of inventory lead time ranges are inversely proportional to average inventory lead times of the plurality of the inventory lead time ranges.

2. The system of claim 1, wherein the controller is further configured to receive an inventory request from a user; to select one or more available inventory assets stored in the cache that match the inventory request; and to provide information to the user about the one or more available inventory assets.

3. The system of claim 2, wherein the controller is further configured to receive a directed inventory request from the user on an inventory asset selected from the one or more available inventory assets and to provide additional information to the user about the inventory asset.

4. The system of claim 3, further comprising:
   a database communicatively coupled to the controller; and
   the controller is further configured to store the inventory asset in the database based at least in part on said receiving of the directed inventory request.

5. The system of claim 2, wherein the controller is further configured to receive a book request for an inventory asset of the one or more available inventory assets from the user; and to transmit a booking confirmation message to a tee sheet of the plurality of tee sheets that is associated with the inventory asset.

6. The system of claim 1, wherein the controller is further configured to receive a query from a first tee sheet of the plurality of tee sheets over a communication channel and poll the first tee sheet for available inventory assets using the communication channel.

7. A method comprising:
   polling, by a network-based golf server (NBGS), on a periodic basis a plurality of tee sheets for available inventory assets over a network, wherein each of the available inventory assets is associated with a respective inventory lead time and said polling on the periodic basis is performed with polling frequencies of a plurality of inventory lead time ranges that are inversely proportional to average inventory lead times of the plurality of inventory lead time ranges;
   receiving, by the NBGS, available inventory assets from the plurality of tee sheets; and
   storing, by the NBGS, the available inventory assets.

8. The method of claim 7, further comprising:
   receiving an inventory request from a user;
   selecting one or more of the available inventory assets that match the inventory request; and
   providing information to the user about the one or more available inventory assets.

9. The method of claim 8, further comprising:
   receiving a directed inventory request from the user on an inventory asset selected from the one or more available inventory assets; and
   providing additional information to the user about the inventory asset.

10. The method of claim 8, further comprising:
    receiving a book request from the user for an inventory asset selected from the one or more available inventory assets.

11. The method of claim 10, further comprising:
transmitting a booking confirmation message to a tee sheet of the plurality of tee sheets that is associated with the inventory asset.

12. The method of claim 7, further comprising:
accessing a dynamic caching schedule; and
polling the plurality of tee sheets based at least in part on the dynamic caching schedule.

13. The method of claim 7, further comprising:
receiving a query from a tee sheet of the plurality of tee sheets over a communication channel; and
polling the tee sheet for available inventory assets using the communication channel.

14. A machine-accessible medium having stored instructions, which, when executed by a machine, results in the machine:
polling on a periodic basis a plurality of tee sheets for available inventory assets over a network, said polling on the periodic basis performed with polling frequencies of a plurality of inventory lead time ranges that are inversely proportional to average inventory lead times of the plurality of inventory lead time ranges;
receiving available inventory assets from the plurality of tee sheets; and
storing the available inventory assets.

15. The machine-accessible medium of claim 14, wherein the stored instructions, when executed by the machine, further results in the machine:
receiving an inventory request from a user;
selecting one or more of the available inventory assets that match the inventory request; and
providing information to the user about the one or more available inventory assets.

16. The machine-accessible medium of claim 15, wherein the stored instructions, when executed by the machine, further results in the machine:
receiving a directed inventory request from the user on an inventory asset selected from the one or more available inventory assets; and
providing additional information to the user about the inventory asset.

17. The machine-accessible medium of claim 15, wherein the stored instructions, when executed by the machine, further results in the machine:
receiving a book request from the user for an inventory asset selected from the one or more available inventory assets; and
transmitting a booking confirmation message to a tee sheet of the plurality of tee sheets that is associated with the inventory asset.

18. The machine-accessible medium of claim 14, wherein the stored instructions, when executed by the machine, further results in the machine:
accessing a dynamic caching schedule; and
polling the plurality of tee sheets based at least in part on the dynamic caching schedule.

19. The machine-accessible medium of claim 14, wherein the stored instructions, when executed by the machine, further results in the machine:
receiving a query from a tee sheet of the plurality of tee sheets over a communication channel; and
polling the tee sheet for available inventory assets using the communication channel.

* * * * *